(12) United States Patent
Itakura (10) Patent No.: US 11,345,106 B2
(45) Date of Patent: May 31, 2022

(54) MANUFACTURING METHOD OF TIRE COMPONENT AND MANUFACTURING DEVICE OF TIRE COMPONENT

(71) Applicant: Toyo Tire & Rubber Co., Ltd., Itami (JP)

(72) Inventor: Junji Itakura, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 214 days.

(21) Appl. No.: 16/218,807

(22) Filed: Dec. 13, 2018

(65) Prior Publication Data

US 2019/0202154 A1 Jul. 4, 2019

(30) Foreign Application Priority Data

Dec. 28, 2017 (JP) .............................. JP2017-254666

(51) Int. Cl.
*B29D 30/30* (2006.01)
*B29D 30/38* (2006.01)
*B29L 30/00* (2006.01)

(52) U.S. Cl.
CPC ......... *B29D 30/3028* (2013.01); *B29D 30/38* (2013.01); *B29L 2030/005* (2013.01)

(58) Field of Classification Search
CPC .......... B29D 30/3028; B29D 2030/421; B29D 2030/4406; B29D 2030/088; B29D 2030/1685; B29D 2030/2692; B29D 2030/2671; B29D 30/26
See application file for complete search history.

(56) References Cited

U.S. PATENT DOCUMENTS

| | | | |
|---|---|---|---|
| 3,674,582 A * | 7/1972 | Leblond | B29D 30/70 156/133 |
| 4,401,502 A * | 8/1983 | Schmidt | B29D 30/06 156/397 |
| 5,904,788 A | 5/1999 | Kitajima et al. | |
| 2001/0008162 A1 | 7/2001 | Shimizu et al. | |
| 2003/0056876 A1 | 3/2003 | Josette Cavalotti | |

(Continued)

FOREIGN PATENT DOCUMENTS

| | | |
|---|---|---|
| DE | 102006018642 A1 | 10/2007 |
| EP | 1 040 908 A2 | 10/2000 |

(Continued)

OTHER PUBLICATIONS

JPat translation of JP59-059431A (Year: 2021).*

(Continued)

*Primary Examiner* — Robert C Dye
*Assistant Examiner* — Alexander D Booth
(74) *Attorney, Agent, or Firm* — WHDA, LLP (57) ABSTRACT

A single sheet-like belt 8b, from which a single tire component can be formed, is held on an outer circumferential surface of a winding cylinder 12. The sheet-like rubber member 8b, which is held by the winding cylinder 12, is removed from the winding cylinder 12 by rotation of a drum 22 and adhered to an outer circumferential surface of the drum 22, so as to manufacture a tire component 8c. At the time, the sheet-like belt 8b is moved from the winding cylinder 12 to the drum 22 via a removing roller 14 that is arranged above a common tangent Q between the drum 22 and the winding cylinder 12.

3 Claims, 7 Drawing Sheets

(56) References Cited

U.S. PATENT DOCUMENTS

| | | |
|---|---|---|
| 2003/0066610 A1 | 4/2003 | Kolker et al. |
| 2009/0032181 A1 | 2/2009 | Tatara et al. |
| 2009/0126874 A1 | 5/2009 | Mehlan et al. |
| 2012/0152418 A1 | 6/2012 | Nishitani |
| 2014/0196834 A1* | 7/2014 | Grashuis ............... B29D 30/30 156/117 |
| 2016/0263847 A1 | 9/2016 | Janszen et al. |

FOREIGN PATENT DOCUMENTS

| | | | | |
|---|---|---|---|---|
| EP | 2 965 895 A1 | 1/2016 | | |
| JP | 59059431 A | * | 4/1984 | ......... B29D 30/3007 |
| JP | S59-59431 A | | 4/1984 | |
| JP | H09-201885 A | | 8/1997 | |
| JP | H10-156966 A | | 6/1998 | |
| JP | 2000-280373 A | | 10/2000 | |
| JP | 2001-113610 A | | 4/2001 | |
| JP | 2004-268548 A | | 9/2004 | |
| JP | 2010-260178 A | | 11/2010 | |
| JP | 2017-501059 A | | 1/2017 | |
| JP | 2017-127986 A | | 7/2017 | |
| WO | 2015/069102 A1 | | 5/2015 | |

OTHER PUBLICATIONS

Office Action dated Oct. 10, 2020, issued in counterpart CN Application No. 201811433761.0, with machine translation. (18 pages).

Office Action dated Aug. 4, 2021, issued in counterpart JP application No. 2017-254666, with English translation. (6 pages).

Extended European Search Report dated May 22, 2019, issued in EP application No. 18211596.4. (counterpart to U.S. Appl. No. 16/219,002) (7 pages).

Office Action dated Aug. 5, 2020, issued in CN Application No. 201811433741.3, with English Translation. (counterpart to U.S. Appl. No. 16/219,002) (10 pages).

Office Action dated Mar. 31, 2021, issued in counterpart CN Application No. 201811433761.0, with English Translation. (21 pages).

Office Action dated Aug. 30, 2021, issued in JP application No. 2017-254668, with English translation, (counterpart to U.S. Appl. No. 16/219,002:)(10 pages).

Final Office Action dated Nov. 2, 2021, issued in U.S. Appl. No. 16/219,002 (15 pages).

* cited by examiner

MANUFACTURING METHOD OF TIRE COMPONENT AND MANUFACTURING DEVICE OF TIRE COMPONENT

BACKGROUND OF THE INVENTION

1. Field of the Invention

The present invention relates to a manufacturing method of a tire component and a manufacturing device of a tire component.

2. Description of Related Art

A pneumatic tire is manufactured by forming each tire component in advance such as an inner liner, a sidewall, a bead, and a tread, adhering these tire components in an unvulcanized state to build an unvulcanized tire called a green tire, and vulcanizing the unvulcanized tire. There is a case where each of these tire components is shaped by winding a sheet-like rubber member formed in a specified cross-sectional shape around an outer circumferential surface of a drum and joining ends of the sheet-like rubber member.

In JP-A-2000-280373, it is proposed that sheet-like rubber members, each of which has length corresponding to circumferential length of a single tire, are manufactured. Thereafter, in a manufacturing order of these sheet-like rubber members, the sheet-like rubber members, each of which has the length corresponding to the circumferential length of the single tire, are sequentially wound around winding means such as a winding roll with a liner being interposed between the sheet-like rubber members at specified space intervals. In a belt shaping process, the sheet-like rubber members, each of which has the length corresponding to the circumferential length of the single tire, are removed from the winding means and supplied to a belt drum, so as to form a belt.

However, in the case where the plural sheet-like rubber members are wound around the single winding means as in Patent Literature described above, it is difficult to perfectly join joint portions of the plural sheet-like rubber members, which leads to a problem of a significantly reduced yield rate.

In the earnest investigation to improve the yield rate, the present inventor has found that, when the sheet-like rubber member was removed from a winding cylinder and wound around the drum, the sheet-like rubber member was possibly stretched and deformed by a tensile force that was applied in a longitudinal direction of the sheet-like rubber member (corresponding to a moving direction of the sheet-like rubber member), and an overlapping amount of the joint portion including the ends of the sheet-like rubber member was increased by this stretched deformation.

That is, in the case where the plural sheet-like rubber members are wound around the single winding means as in Patent Literature described above, a curvature of the sheet-like rubber member on an inner side wound around the winding means differs from a curvature of the sheet-like rubber member on an outer side wound around the winding means. Thus, an amount of the tensile force that is generated at the time when the sheet-like rubber member is removed from the winding means differs by the sheet-like rubber members. As a result, an amount of the stretched deformation varies by the sheet-like rubber members, and it is difficult to perfectly join the joint portion of each of the plural sheet-like rubber members.

In particular, in the case where each of the sheet-like rubber members has a parallelogram shape like a sheet-like belt, from which a belt is formed, a tip side (a winding start side) and a rear end side (a winding finish side) of the sheet-like belt are tapered and likely to be stretched and deformed. In addition, the joint portion is provided in an inclined side that is inclined with respect to a circumferential direction of the drum. Accordingly, as an angle of the inclined side with respect to the moving direction of the sheet-like rubber member is reduced, the sheet-like rubber member is more likely to be stretched and deformed, and the joint portion is extended. As a result, it is difficult to perfectly join the joint portion.

SUMMARY OF THE INVENTION

The present invention has been made in view of the above circumstance and therefore has a purpose of providing a manufacturing method of a tire component and a manufacturing device of a tire component capable of suppressing deformation of a sheet-like rubber member at the time when the sheet-like rubber member is removed from a winding cylinder and wound around a drum and capable of suppressing an overlapping amount in a joint portion from being increased.

A manufacturing method of a tire component according to the present invention includes adhering a sheet-like rubber member to an outer circumferential surface of a drum. In the manufacturing method of the tire component, the single sheet-like rubber member, from which the single tire component can be formed, is held on an outer circumferential surface of a winding cylinder. The sheet-like rubber member, which is held by the winding cylinder, is removed from the wind,ng cylinder by rotation of the drum and is adhered to the outer circumferential surface of the drum, so as to manufacture a tire component.

A manufacturing device of a tire component according to the present invention manufactures a tire component by adhering a sheet-like rubber member to an outer circumferential surface of a drum. The manufacturing device of the tire component includes: a winding cylinder that holds the single sheet-like rubber member, from which the single tire component can be formed, on an outer circumferential surface of the winding cylinder; and a drum drive device that causes rotation of the drum, removes the sheet-like rubber member from the outer circumferential surface of the winding cylinder, and adheres the sheet-like rubber member to the outer circumferential surface of the drum.

DESCRIPTION OF EMBODIMENTS

A description will be made on an embodiment on the basis of the drawings. Note that the embodiment merely constitutes an example and falls within the scope of the present invention when appropriately be changed within the scope that does not depart from the gist of the present invention. In the drawings, size, a shape, and the like of each component may be exaggerated or may schematically be illustrated for explanation. However, each of these drawings merely constitutes an example and thus has no intention to limit interpretation of the present invention.

1. Structure and Manufacturing Method of Entire Pneumatic Tire 1

(1) Structure of Entire Pneumatic Tire 1

Figure 1:
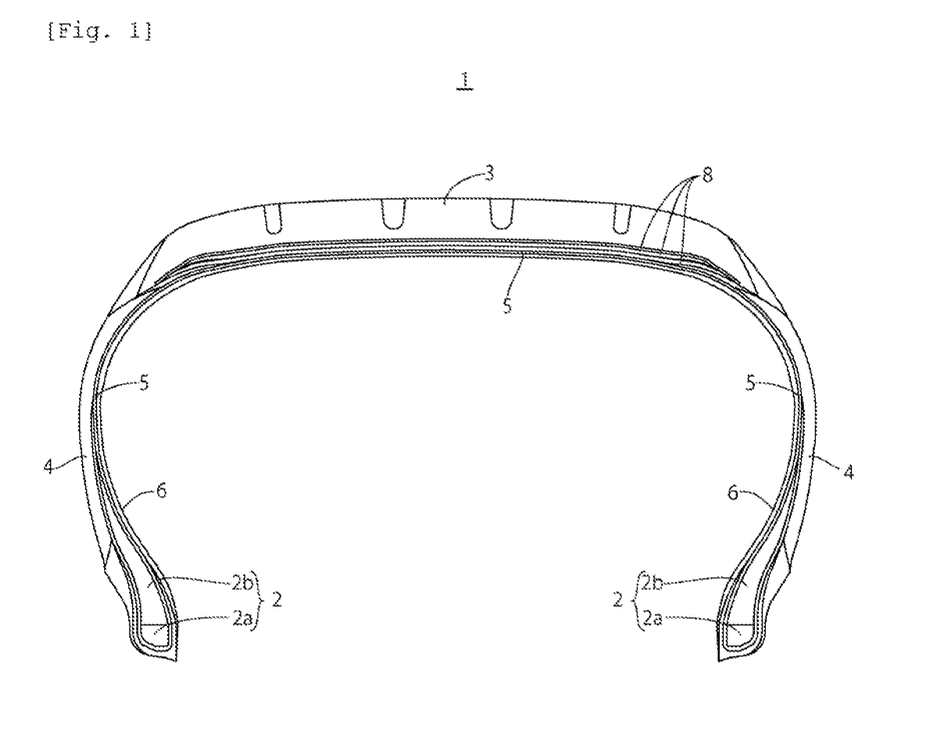
FIG. 1 is a cross-sectional view of a pneumatic tire in a width direction.

FIG. 1 illustrates an example of a pneumatic tire 1. This pneumatic tire 1 is a radial tire for a heavy load and is used for a truck, a bus, or the like, for example.

A bead 2 is provided on each side in a width direction of the pneumatic tire 1. The bead 2 includes: a bead core 2a that is made of steel wire wound in an annular shape; and a bead filler 2b that is made of rubber and is provided on a radially outer side of the bead core 2a. A carcass ply 5 stretches between the beads 2 on both of the sides in a tire width direction. The carcass ply 5 is a sheet-like member in which a large number of ply cords arranged in an orthogonal direction to a tire circumferential direction is coated with rubber. Between the beads 2 on both of the sides in the tire width direction, the carcass ply 5 defines a frame shape of the pneumatic tire 1. In addition, the carcass ply 5 surrounds each of the beads 2 when being folded around the bead 2 from an inner side to an outer side in the tire width direction. A sheet-like inner liner 6 that has a rubber layer with low air permeability is adhered to an inner side of the carcass ply 5.

Plural belts 8 are provided on an outer side of the carcass ply 5 in a tire radial direction. A structure of each of the belts 8 will be described below. Tread rubber 3 having a ground contact area is provided on an outer side of the belts 8 in the tire radial direction. Sidewall rubber 4 is provided on each side in the tire width direction of the carcass ply 5. In addition to these components, components such as a belt under pad and a chafer are provided according to functional need of the pneumatic tire 1.

(2) Manufacturing Method of Entire Pneumatic Tire 1

A brief description will be made on an example of a manufacturing method of the pneumatic tire 1 having the configuration that has been described so far. First, each of the above components that constitutes the pneumatic tire 1 is prepared. As will be described below, a sheet-like belt 8b that is cut out of raw fabric 8a is prepared as a component that serves as the belt 8 in the pneumatic tire 1 in the last stage.

Figure 2A:
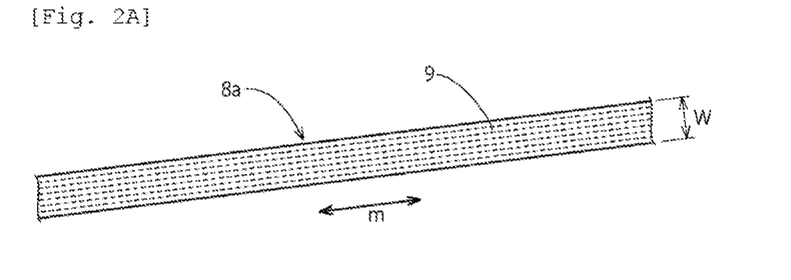
FIG. 2A is a plan view of raw fabric.
Figure 2B:
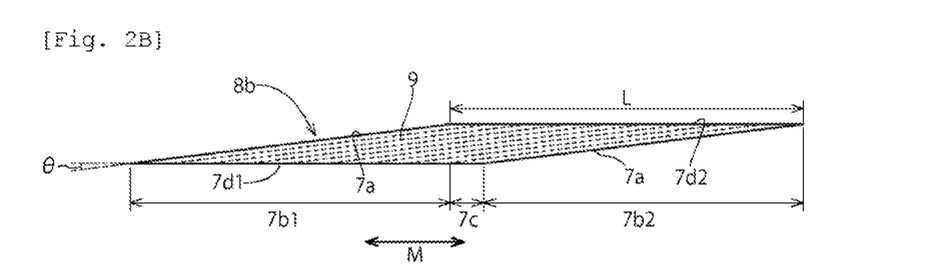
FIG. 2B is a plan view of a sheet-like belt.
Figure 2C:
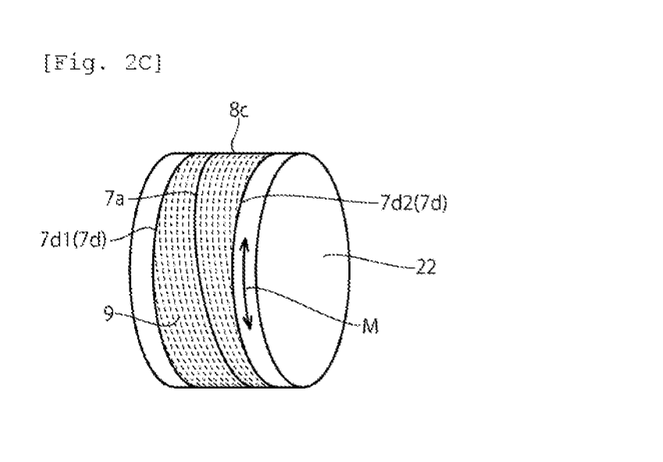
FIG. 2C is a perspective view of a cylindrical belt.

Next, the prepared sheet-like belt 8b is wound around a drum 22 (see FIG. 2), and a cylindrical belt 8c (see FIG.) 2) is thereby manufactured. Since the pneumatic tire 1 has the plural belts 8, the plural sheet-like belts 8b are sequentially wound around the drum 22, so as to manufacture a component in which the plural cylindrical belts 8c overlap each other. Next, the tread rubber 3 is adhered to an outer diameter side of the cylindrical belts 8c. In this way, a cylindrical tread ring that includes the plural cylindrical belts 8c and the tread rubber 3 is completed.

In addition, the sheet-like inner liner 6 and the sheet-like carcass ply 5 are adhered onto another cylindrical drum, and a cylindrical body referred to as a primary case is thereby completed. Next, the annular bead 2 is set on both sides in an axial direction of the primary case.

Next, the primary case is shaped by expanding the primary case to the outer diameter side thereof between the beads 2 on both of the sides and thereby deforming the primary case in a toroidal shape. Then, the above tread ring is adhered to an outer diameter side of a toroidally-expanded portion of the primary case. Meanwhile, turnup is also performed during shaping. In the turnup, the carcass ply 5 is folded around each of the beads 2. Then, the sidewall rubber 4 is adhered to both sides in the axial direction of the toroidally-expanded portion of the primary case. As described so far, an unvulcanized tire is completed.

Next, the unvulcanized tire is vulcanized in a mold, and the pneumatic tire 1 is thereby completed. The cylindrical belt 8c described above is vulcanized and serves as the belt 8 in the pneumatic tire 1.

The description that has been made so far on the manufacturing method merely constitutes an example of the description. Thus, an appropriate change, such as switching of the order of some processes described so far, can be made to the description so far. For example, after the beads 2 are set in the primary case and the turnup is performed, the sidewall rubber 4 maybe adhered to specified positions, and thereafter the primary case may be shaped.

2. Overview Structure and Manufacturing Method of Cylindrical Belt 8c

In this embodiment, a description will he made on a case where a sheet-like rubber member is wound around an outer circumferential surface of the drum 22 so as to manufacture the tire component. More specifically, a description will be made on a case where the sheet-like belt 8b in a parallelogram shape is used as the sheet-like rubber member and the sheet-like belt 8b is adhered to the outer circumferential surface of the drum 22, so as to manufacture the tire component that is formed of the cylindrical belt 8c.

The cylindrical belt 8c is formed by coating plural belt cords 9 (see FIG. 2), each of which extends obliquely with respect to the tire circumferential direction, with rubber. Note that, in this embodiment, each of the belt cords 9 is made of steel but may be made of organic fiber. Of the plural belts 8 provided in the pneumatic tire 1, at least one is manufactured by using the raw fabric 8a and the sheet-like belt 8b, which will be described below.

As illustrated in FIG. 2A, the raw fabric 8a is formed by coating the plural belt cord 9, which are arranged in parallel, with unvulcanized rubber. An extending direction of each of the belt cords matches a longitudinal direction m of the raw fabric 8a.

When the raw fabric 8a cut obliquely with respect to the longitudinal direction thereof, the sheet-like belt 8b illustrated in FIG. 2B is cut out.

In a plan view, the sheet-like belt 8b has the parallelogram shape that includes: paired cut sides 7d1, 7d2 as cut marks of the raw fabric 8a; and paired inclined sides 7a that connect both ends of the cut sides 7d1, 7d2.

The cut sides 7d1, 7d2 are paired lateral sides of the sheet-like belt 8b (in other words, both sides in the width direction of the sheet-like belt 8b). An extending direction N of each of the cut sides 7d1, 7d2 matches a longitudinal direction of the sheet-like belt 8b. In addition, as will be described below, in the plan view, the extending direction M of each of the cut sides 7d1, 7d2 matches a circumferential direction of the drum 22 and a moving direction of the sheet-like belt 8b that s moved from a winding cylinder 12 provided in a supply section 30 to the drum 22.

The inclined sides 7a are portions that are originally both sides in the width direction of the raw fabric 8a and constitute and edges in the longitudinal direction M of the sheet-like belt 8b. The inclined sides 7a are parallel to the belt cords 9.

An angle θ of the sheet-like belt 8b that is defined by the longitudinal direction M thereof and each of the belt cords 9 (this angle matches an angle defined by the longitudinal direction M and each of the inclined sides 7a of the sheet-like belt 8b and also matches a cut angle of the raw fabric 8a with respect to the longitudinal direction m thereof) is small, and is equal to or larger than 6° and equal to or smaller than 9°, for example. In the case where the angle defined by the longitudinal direction M of the sheet-like belt 8b and each of the belt cords 9 is small, the completed belt 8 exhibits high binding force in the tire radial direction.

The sheet-like belt 8b in such a flat parallelogram shape has: inclined regions 7b1, 7b2 as tapered regions in the extending direction M of the cut sides 7d1, 7d2; and a maximum-width region 7c as a region that does not have the inclined side 7a and has the maximum width. Length each of the cut sides 7d1 7d2 of the sheet-like belt 8b corresponds to circumferential length of a single tire (circumferential length of the drum 22), and the single cylindrical belt 8c can be shaped by using the single sheet-like belt 8b.

Note that width W of the raw fabric 8a is set such that, when the cut angle of the raw fabric 8a with respect to the longitudinal direction of the raw fabric 8a is set as θ and the length of each of the cut sides 7d1, 7d2 is set as L, W =L×sin θ is satisfied.

In this embodiment, the single sheet-like belt 8b that has the parallelogram shape and is cut out of the raw fabric 8a as described above is wound around the outer circumferential surface of the single winding cylinder 12 and is then set in the supply section 30 of a manufacturing device that manufactures the cylindrical belt 8c, which will be described below (hereinafter referred to as a manufacturing device) 20. As illustrated in FIG. 2C, the sheet-like belt 8b that is set in the supply section 30 is wound around the outer circumferential surface of the drum 22 in the manufacturing device 20 and is shaped as the cylindrical belt 8c configured as one of the plural existing belts 8.

3. Manufacturing Device 20

The manufacturing device 20, which is illustrated in FIG. 3 to FIG. 6, includes the supply section 30, the drum 22, a detecting section 50, a removing roller 14, and a control unit 70. The sheet-like belt 8b is pulled from the winding cylinder 12, which is set the supply section 30, and is wound around the outer circumferential surface of the drum 22, so as to manufacture the cylindrical belt 8c.

Figure 3:
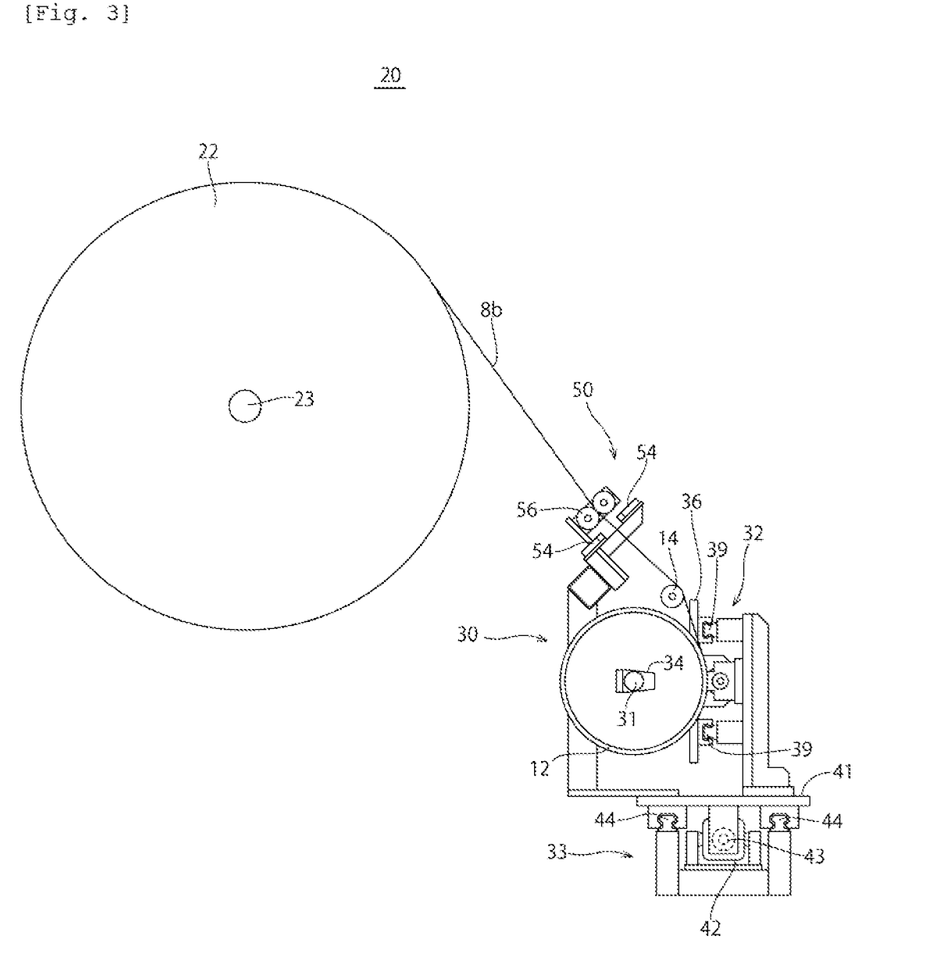
FIG. 3 is a side view of a manufacturing device of a tire component.
Figure 4:
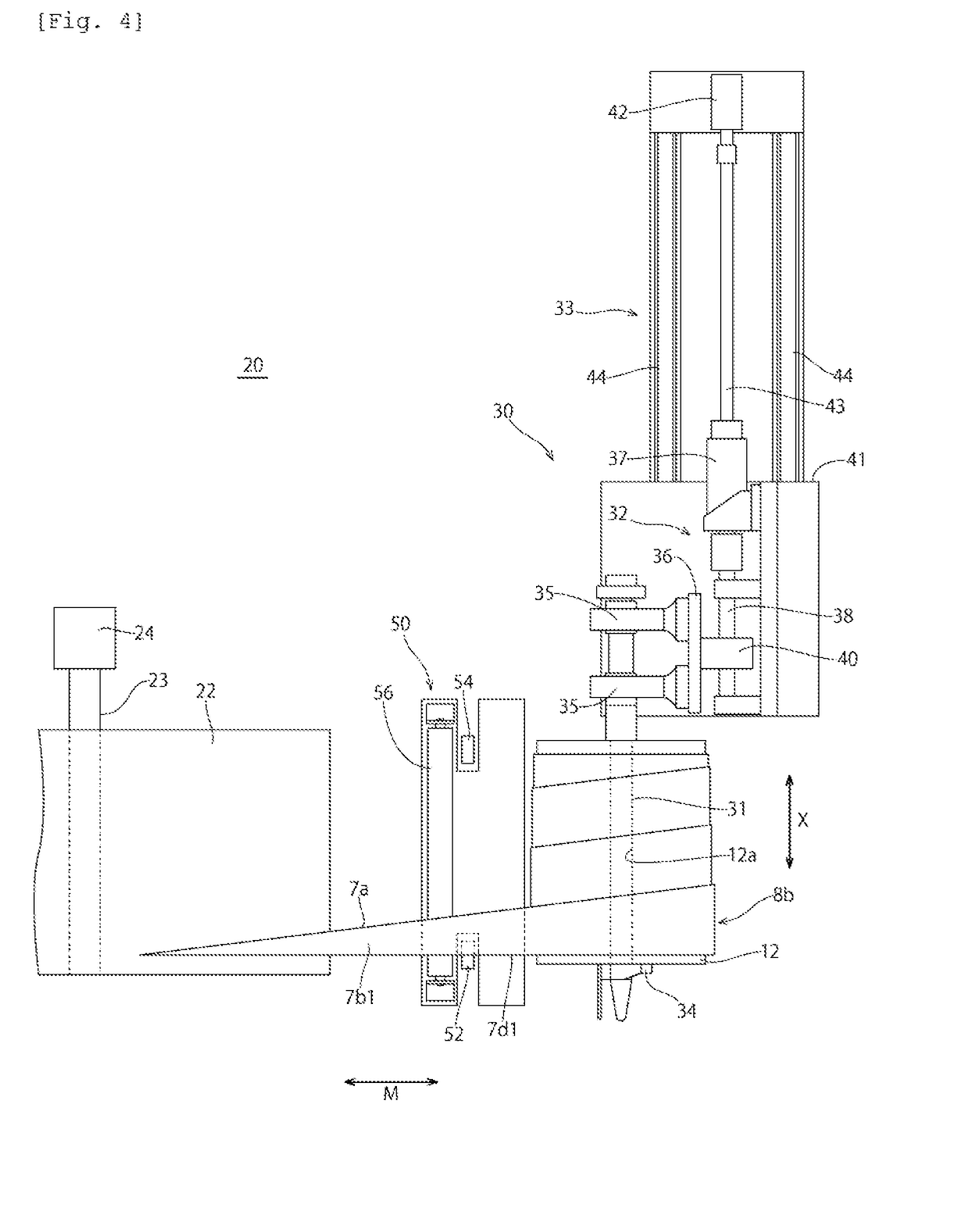
FIG. 4 is a plan view of the manufacturing device of the tire component.

The supply section 20 includes: a spindle 31 that holds the winding cylinder 12, around which the sheet-like belt 8b is wound; an offset moving section 32 that moves the spindle 31 in an axial direction X of the spindle 31; and a transfer section 33 that moves the winding cylinder 12 between a supply position and a replacing position, which will be described below.

The spindle 31 is arranged in parallel with a rotational shaft 23 of the drum 22 and is inserted through a spindle hole 12a of the winding cylinder 12 from a tip of the spindle 31. The winding cylinder 12 is arranged such that, when the spindle 31 is inserted through the winding cylinder 12, axial directions of the winding cylinder 12 and the drum 22 become parallel with each other, and is supported by a lock mechanism 34 in a nonrotatable manner about the spindle 31. In addition, the width direction of the sheet-like belt 8b, which is wound around the winding cylinder 12, matches the axial direction X of the spindle 31.

Such a spindle 31 is rotatably supported by a base plate 36 of the offset moving section 32 via bearings 35.

Note that the supply section 39 has braking means 45 (see FIG. 6) that stops rotation of the spindle 31.

The offset moving section 32 includes: the base plate 36; a base drive motor 37; a ball screw 38 that is connected to a rotational shaft of the base drive motor 37; a guide rail 39 that extends along the axial direction X of the spindle 31; and a ball nut 40 that is screwed to the ball screw 38.

In the offset moving section 32, the base plate 36 that supports the spindle 31 is coupled to the ball screw 38 via the ball nut 40. In addition, the base plate 36 is disposed on the guide rail 39 in a slidable manner in the axial direction X. In the offset moving section 32, the base drive motor 37 controls rotation of the ball screw 38. In this way, while controlling a displacement amount in the axial direction X, the offset moving section 32 moves the spindle 31 with the base plate 36, which is coupled to the ball nut 40. Accordingly, the sheet-like belt 8b, which is wound around the winding cylinder 12, is moved in the width direction X.

The transfer section 33 includes: a transfer plate 41 to which the removing roller 14, the offset moving section 32, and the detecting section 50 are attached; a transfer motor 42; a ball. screw 43 that is connected to a rotational shaft of the transfer motor 42; a guide rail 44 that extends along the axial direction X; and a ball nut (not illustrated) that is screwed to the ball screw 43.

In the transfer section 33, the transfer plate 41 is coupled to the ball screw 43 via the ball nut, which is not illustrated, and is disposed on the guide rail 44 in a slidable manner in the axial direction X. When the transfer motor 42 causes rotation of the ball screw 43, With the transfer Plate 41 coupled to the ball nut, the transfer section 33 moves the winding cylinder 12 supported on the spindle 31, the removing roller 14, and the detecting section 50 between the supply position that opposes the drum 22 as illustrated in FIG. 4 and the replacing position that is offset from the drum 22 in the axial direction X.

The drum 22 has a cylindrical shape and is rotatably supported about the rotational shaft 23, which is arranged in parallel with the spindle 31 of the supply section 30. A tip of the sheet-like belt 8b that is wound around the winding cylinder 12 is adhered to a specified position on the drum 22 through the removing roller 14 and the detecting section 50. The drum 22, to which the tip of the sheet-like belt 8b is adhered, rotates about the rotational shaft 23 by receiving power from a drum drive device 24. In this way, the drum 22 winds the sheet-like belt 8b therearound while removing the sheet-like belt 8b from the winding cylinder 12, so as to shape the cylindrical belt 8c on the outer circumferential surface of the drum 22.

The deter ting section 50 is provided between the supply section 30 and the drum 22, that is, in the middle of a path of the sheet-like belt 8b from a position where the sheet-like belt 8b removed from the winding cylinder 12 arranged in the supply section 30 to a position where the sheet-like belt 8b is wound around the drum 22 (hereinafter, such a path will also be referred to as an adhesion path).

The detecting section 50 includes: a first sensor 52 and a second sensor 54 that detect positions of the paired lateral sides (the sides opposing the width direction X of the sheet-like belt 8*b* and corresponding to the paired cut sides) 7*d*1, 7*d*2 of the sheet-like belt 8*b* passing the adhesion path; and a vertical pair of holding rollers 56.

The first sensor 57 is a non-contact position sensor such as a laser displacement sensor and detects the position of the one lateral side 7*d*1 that has the inclined region 7*b*1 on the tip side (a winding start side) and the maximum-width region 7*c* of the sheet-like belt 8*b*.

The first sensor 52 is a non-contact position sensor such as a laser displacement sensor and detects the position of the one lateral side 7*d*1 that has the inclined region 7*b*1 on the tip side (a winding start side) and the maximum-width region 7*c* of the sheet-like belt 8*b*.

Similar to the first sensor 52, the second sensor 54 is the non-contact position sensor such as the laser displacement sensor, is arranged at a position that opposes the first sensor 52 with a space being interposed therebetween in the axial direction X, and detects the position of the other lateral side 7*d*2 that has the maximum-width region 7*c* and the inclined region 7*b*2 on a rear end side (a winding finish side) of the sheet-like belt 8*b*.

Figure 5:
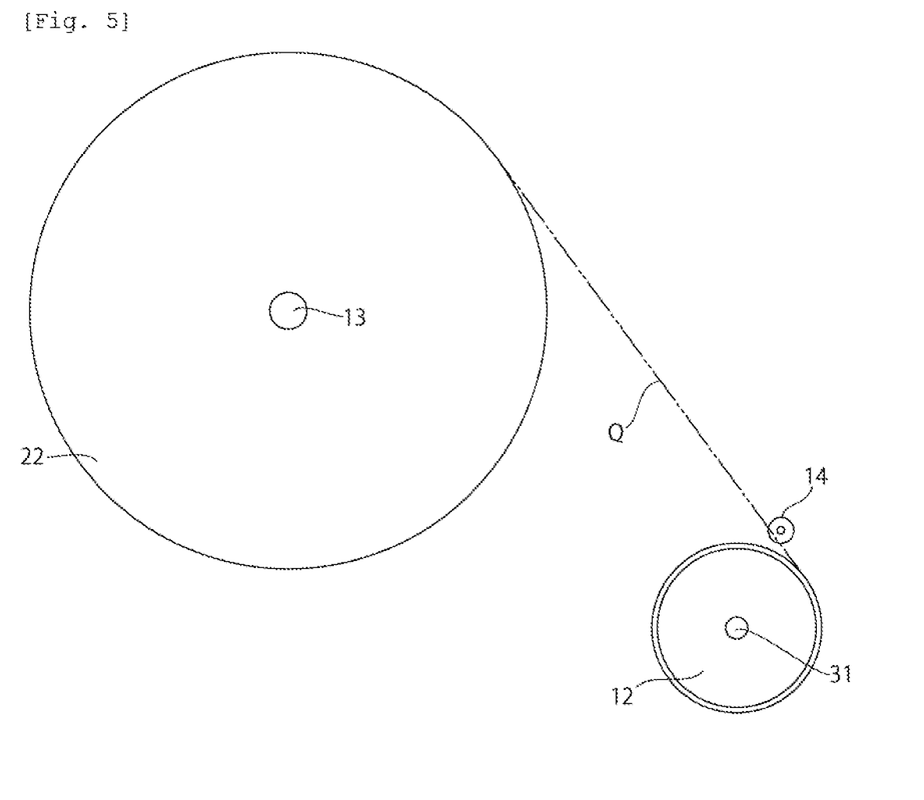
FIG. 5 is a view of arrangement of a holding roller, a removing roller, and a winding cylinder.

The holding rollers 56 are arranged on a downstream side (that is, on the drum 22 side) of the adhesion path from the first sensor 52 and the second sensor 54 and are preferably arranged near the first sensor 52 and the second sensor 54. The holding rollers 56 hold the sheet-like belt 8*b* therebetween and position the sheet-like belt 8*b* such that the sheet-like belt 8*b* at a specified position in a thickness direction thereof passes the first sensor 52 and the second sensor 54. On an upstream side (that is, the supply section 30 side) of the adhesion path form the holding rollers 56, the removing roller 14 is provided to pull the sheet-like belt 8*b* upward so as to remove the sheet-like belt 8*b* from an outer circumferential surface of the winding cylinder 12.

The removing roller 14 is arranged at a position that is located above the winding cylinder 12 and that overlaps the winding cylinder 12 in a plan view, or is arranged at a position behind the winding cylinder 12 in the moving direction of the sheet-like belt 8*b*. In addition, as illustrated in FIG. 5, the removing roller 14 is arranged on an outer side of a common tangent Q between the drum 22 and the winding cylinder 12, that is, on an opposite side of the winding cylinder 12 corresponding to a top side in FIG. 5.

In this way, the removing roller 14 supports a lower surface of the sheet-like belt 8*b* at the position between the holding rollers 56 and the winding cylinder 12, and removes the sheet-like belt 8*b* from the outer circumferential surface of the winding cylinder 12 while applying a force in a radially outward direction of the winding cylinder 12 to the sheet-like belt 8*b*. Accordingly, even in the case where the sheet-like belt 8*b* is tightly wound around the winding cylinder 12, the removing roller 14 can remove the sheet-like belt 8*b* from the outer circumferential surface of the winding cylinder 12 while minimizing a tensile force that is applied to the sheet-like belt 8*b* in the longitudinal direction M.

Figure 6:
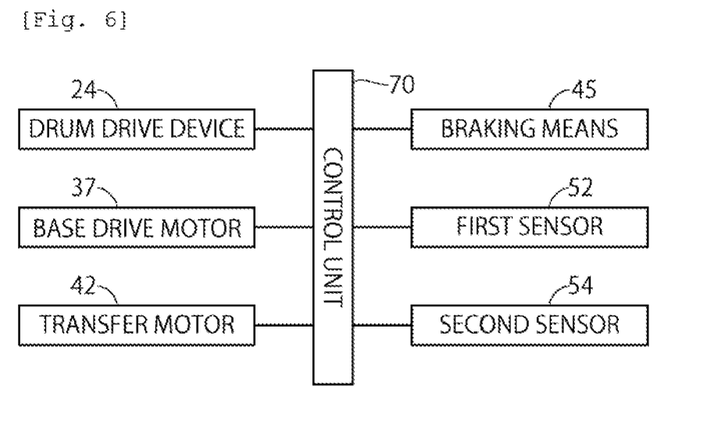
FIG. 6 is a block diagram of a control configuration of the manufacturing device of the tire component.

The control unit 70 is electrically connected to each section that operates the manufacturing device 20, and controls each of the sections. Furthermore, the control unit 70 is at least electrically connected to the drum drive device 24, the base drive motor 37, the transfer motor 42, the braking means 45, the first sensor 52, and the second sensor 54 and can control each of the above sections at leas ton the basis of detection results of those sensors. FIG. 6 illustrates some of the sections that are electrically connected to the control unit 70. A manufacturing method of a tire belt, which will be described next, can be executed through control by the control unit 70.

4. Manufacturing Method of Cylindrical Belt 8*c*

Figure 7:
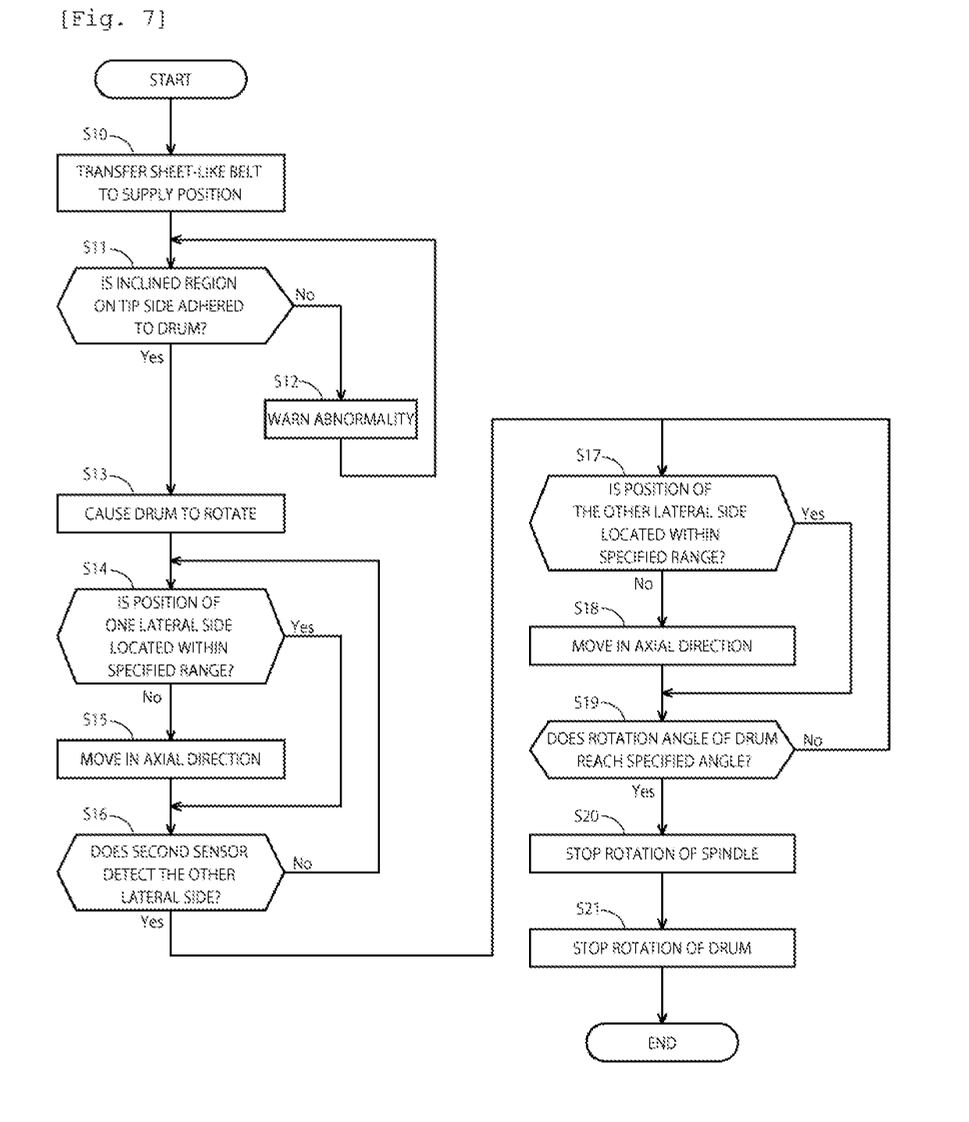
FIG. 7 is a flowchart of an operation of the manufacturing device of the tire component.

A description will herein be made on the manufacturing method of the tire belt, that is, the cylindrical belt 8*c* that is used for the pneumatic tire 1 with reference to FIG. 7. The description will herein be made on the basis of an assumption that the manufacturing device 20 described above is used to execute this manufacturing method.

First, the spindle 31 is arranged at the replacing position that deviates from the drum 22 in the axial direction X. The spindle 31 is then inserted through the spindle hole 12*a* of the winding cylinder 12. In this way, along with the winding cylinder 12, the one sheet-like belt 8*b*, which is formed in the specified parallelogram shape, is set in the supply section 30. Thereafter, the transfer motor 31 causes the rotation of the ball screw 43 and moves the spindle 31 from the replacing position to the supply position. The sheet-like belt 8*b*, which is wound around the winding cylinder 12, is transferred to the supply position opposing the drum 22 (step S10).

Next, a tip of the inclined region 7*b*1 on the tip side of the sheet-like belt 8*b*, which is wound around the winding cylinder 12, is adhered to the specified position on the outer circumferential surface of the drum 22 through the removing roller 14 and the detecting section 50. At this time, the detecting section 50 determines whether the inclined region 7*b*1 on the tip side of the sheet-like belt 8*b* is adhered to the drum 22 (step S11).

More specifically, in the case where, of the first sensor 52 and the second sensor 54 provided in the detecting section 50, only the first sensor 52, which detects the one lateral side 7*d*1 constituting the inclined region 7*b*1 on the tip side of the sheet-like belt 8*b*, detects the sheet-like belt 8*b* and the second sensor 54, which detects the other lateral side 7*d*2 constituting the inclined region 7*b* 2 on the rear and side, does not detect the sheet-like belt 8*b*, it is determined that the inclined region 7*b*1 on the tip side is adhered to the drum 22. On the other hand, in the case where only the second sensor 54 detects the sheet-like belt 8*b* and the first sensor 52 does not detect the sheet-like belt 8*b*, it is determined that the inclined region 7*b*2 on the rear end side is adhered to the drum 22.

Then, if the inclined region 7*d*2 on the rear and side is adhered to the drum 22 (No in step S11), it is determined that the inclined region 8*b*1 on the tip side is not adhered to the drum 22. Thus, the drum 22 does not rotate, and such abnormality is warned (step S12).

If the inclined region 7*b*1 on the tip side is adhered to the drum 22 (Yes in step S11), the drum drive device 24 is activated, and the drum 22 rotates about the rotational shaft 23. When the drum 22 rotates and starts winding the sheet-like belt 8*b* therearound from the winding cylinder 12, the winding cylinder 12 rotates by the tensile force of the sheet-like belt 8*b* and starts feeding the sheet-like belt 8(step S13).

When the drum 22 rotates, in order to adhere the sheet-like belt 8*b* to the specified position on the drum 22, the control unit 70 executes position adjustment control on the basis of the positions of both of the lateral sides 7*d*1, 7*d*2 of the sheet-like belt 8*b* detected by the detecting section 50, to adhere the sheet-like belt 8*b* to the specified position on the drum 22 (step S14 to Step S19).

More specifically, in step S14, the first sensor 52 detects the position of the one lateral side 7*d*1 in the inclined region 7*b*1 on the tip side and determines whether the detected position of the one lateral side 7*d*1 is located within a specified range.

If the position of the one lateral side 7*d*1 is located within the specified range (hereinafter also referred to as a reference range) (Yes in step S14), it is determined that the sheet-like belt 8*b* is adhered to the specified position on the drum 22, that an angle of the moving direction of the sheet-like belt 8*b* with respect to the circumferential direction of the drum 22 is small, and that both of the directions are substantially parallel with each other. Accordingly, the processing proceeds to step S16 without moving the spindle 31 in the axial direction X, that is, without moving the sheet-like belt 8*b* in the width direction X.

On the other hand, if the position of the one lateral side 7*d*1 is not located within the reference range, that is, if the position of the one lateral side 7*d*1 deviates from the reference range in the axial direction X (No in step S14), it is determined that the sheet-like belt 8*b* is not adhered to the specified position on the drum 22 and that the moving direction of the sheet-like belt 8*b* is inclined with respect to the circumferential direction of the drum 22. Accordingly, in order to correct the inclination, the processing proceeds to step S15.

In step S15, it is determined whether the position on the one lateral side 7*d*1, which is detected in step S14, deviates to one side or to the other side in the axial direction X from the reference range. Then, the spindle 31 is moved to an opposite side from the deviated side, so as to correct the deviation of the sheet-like belt 8*b*. Note that a movement amount of the spindle 31 (a movement amount of the sheet-like belt 8*b*) in step S15 is set as a constant amount regardless of a deviation amount form the reference range.

Then, after the spindle 31 is moved to correct the deviation of the sheet-like belt 8*b*, the processing proceeds to step S16, and it is determined whether the second sensor 54 detects the other lateral side 7*d*2 of the sheet-like belt 8*b*. If the second sensor 54 does not detect the other lateral side 7*d*2 of the sheet-like belt 8*b* (No in step S16), the processing returns to step S14, the first sensor 52 detects the position of the one lateral side 7*d*1 (step S14), and, in accordance with the detected position, the spindle 31 is moved in the axial direction X to correct the deviation of the sheet-like belt 8*b* step S15). In this embodiment, the position detection of the one lateral side 7*d*1 by the first sensor 52 and the correction of the deviation of the sheet-like belt 8*b*, just as described, are repeatedly made at specified time intervals (for example, every 0.2 second).

Thereafter, when the drum 22 keeps rotating and the maximum-width region 7*c* of the sheet-like belt 8*b* passes the detecting section 50, the first sensor 52 detects the one lateral side 7*d*1 of the sheet-like belt 8*b*, and the second sensor 54 detects the other lateral side 7*d*2 thereof (Yes in step S16). Then, in accordance with the position of the other lateral side 7*d*2 detected by the second sensor 54, the control unit 70 moves the spindle 31 in the axial direction X to correct the deviation of the sheet-like belt 8*b* (step S17, step S18).

More specifically, if the position of the other lateral side 7*d*2 detected by the second sensor 54 is located within a reference range (Yes in step S17), the processing proceeds to step S19 without moving the spindle 31 in the axial direction X. If the position of the other lateral side 7*d*2 detected by the second sensor 54 is not located within the reference range (No in step S17), it is determined whether the position of the other lateral side 7*d*2 detected in step S17 deviates to the one side or to the other side in the axial direction X from the reference range. Then, the spindle 31 is moved to an opposite side from the direction of the deviation, so as to correct the deviation of the sheet-like belt 8*b* (step S18). A movement amount of the spindle 31 in step S18 is set as a constant amount regardless of a deviation amount from the reference range. Then, after the spindle 31 is moved to correct the deviation of the sheet-like belt 8*b*, the processing proceeds to step S19.

Then, the control unit 70 determines whether the drum 22 has rotated at a specified angle and winding of the sheet-like belt 8*b* around the drum 22 is completed (step S19). If a rotation angle of the drum 22 does not reach the specified angle (No in step S19), the processing returns to step S17, the second sensor 54 detects the position of the other lateral side 7*d*2 (step S17), and, in accordance with the detected position, the spindle 31 is moved in the axial direction X to correct the deviation of the sheet-like belt 8*b* (step S18). In this embodiment, the position detection of the other lateral side 7*d*2 by the second sensor 54 and the movement of the spindle 31, just as described, are repeatedly made at specified time intervals (for example, every 0.2 second).

Then, if the drum 22 keeps rotating and the drum 22 rotates at the specified angle (Yes in step S19), the braking means 45 first stops the rotation of the spindle 31 and the rotation of the winding cylinder 12 (step S20), and then stops the rotation of the drum 22 (step S21) to terminate shaping of the cylindrical belt 8*c*. When shaping is terminated, as illustrated in FIG. 2C, the inclined sides 7*a* on both of the sides in the longitudinal direction of the original sheet-like belt 8*b* are joined to each other without overlapping each other, and the cylindrical belt 8*c* is thereby obtained.

5. Effects

As it has been described so far, in this embodiment, the single sheet-like belt 8*b*, which has the parallelogram shape and has the length corresponding to the circumferential length of the single tire, is wound around the outer circumferential surface of the single winding cylinder 12. Accordingly, an amount of the tensile force, which is generated the time when the sheet-like belt 8*b* is removed from the winding cylinder 12 by the rotation of the drum 22, can be maintained to be constant for each of the sheet-like 8*b*. Thus, it is easy to set a shaping condition for perfectly joining the joint portion of the sheet-like belt 8*b*, and a yield rate of the shaped cylindrical belt 8*c* can be improved.

In this embodiment, the removing roller 14 is provided to pull the sheet-like belt upward so as to remove the sheet-like belt 8*b* from the outer circumferential surface of the winding cylinder 12. Accordingly, the removing roller 14 can remove the sheet-like belt 8*b* from the outer circumferential surface of the winding cylinder 12 while minimizing the tensile force that is applied to the sheet-like belt 8*b* in the longitudinal direction M. Thus, the yield rate of the shaped cylindrical belt 8*c*can further be improved.

That, is, because the deformation of the sheet-like belt 8*b*, which is caused by the tensile force applied in the longitudinal direction M, is suppressed, the position of the sheet-like belt 8*b* can accurately be detected by using the first sensor 52 and the second sensor 54. Accordingly, it is possible to suppress the inclination of the moving direction of the sheet-like belt 8*b* with respect to the circumferential direction of the drum 22 by moving the spindle 31, which supports the winding cylinder 12, in the axial direction X in accordance with the detected position. Thus, the inclined sides 7*a* on both of the sides in the longitudinal direction of the sheet-like belt 8*b* can be to each other without overlapping each other, and the cylindrical belt 8*c* can thereby be shaped.

In particular, as in this embodiment, in the case where each of the cords 9 is provided to have the small angle with respect to a direction in which the tensile force is applied to the sheet-like belt 8*b* (the longitudinal direction M), in the inclined region 7*b*1 on the tip side of the sheet-like belt 8*b*, the one lateral side 7*d*1 is likely to be deformed in a manner to be bulged to the outer side in the width direction when being applied with the tensile force in the longitudinal direction M. However, in this embodiment, it is possible to minimize the tensile force that is applied to the sheet-like belt 8*b* having such cords 9. Thus, both of the inclined sides 7*a* of the sheet-like belt 8*b* can be joined to each other without overlapping each other.

The above embodiment is merely provided as an example and thus has no intention of limiting the scope of the invention. This novel embodiment can be implemented in any of various other modes, and various types of elimination, replacement, and changes can be made thereto within the scope that does not depart from the of the invention.

For example, in the above embodiment, the description has been made on the case where a power source to cause the rotation of the winding cylinder 12 is not provided and the winding cylinder 12 rotates by using the tensile force of the sheet-like belt 8*b*, which is associated with the rotation of the drum 22. However, in addition to the drum drive device 24 for the drum 22, another drive device may be provided for the winding cylinder 12 to cause the rotation of the winding cylinder 12.

What is claimed is:

1. A manufacturing method of a tire component that includes adhering a sheet-like rubber member to an outer circumferential surface of a drum, the manufacturing method of the tire component comprising:
    holding the single sheet-like rubber member, from which the single tire component can be formed, on an outer circumferential surface of a winding cylinder, removing the sheet-like rubber member, which is held by the winding cylinder, from the winding cylinder by rotation of the drum, and adhering the sheet-like rubber member to the outer circumferential surface of the drum,
    moving the sheet-like rubber member from the winding cylinder to the drum via a removing roller that is arranged above a common tangent between the drum and the winding cylinder,
    wherein the sheet-like rubber member has a parallelogram shape that includes paired lateral sides and paired inclined sides, the paired lateral sides being arranged in parallel with a moving direction of the sheet-like rubber member that is moved from the winding cylinder to the drum, and the paired inclined sides being inclined with respect to the moving direction of the sheet-like rubber member at ends in the moving direction, and
    only the sheet-like rubber member of a size that makes it possible to manufacture the single tire component is held around the winding cylinder.

2. The manufacturing method of the tire component according to claim 1 further comprising:
    stopping rotation of the winding cylinder and thereafter stopping rotation of the drum, so as to terminate manufacturing of the tire component.

3. The manufacturing method of the tire component according to claim 1 further comprising:
    a detecting system for detecting the adherence of the sheet-like member to the removing roller; and
    an offset moving section for replacing the sheet-like member, wherein the offset moving section is movable in an axial x direction of the winding cylinder.

* * * * *